United States Patent
Jetter et al.

(10) Patent No.: US 9,038,001 B2
(45) Date of Patent: May 19, 2015

(54) SYSTEM AND METHOD FOR GRAPHICALLY ILLUSTRATING EXTERNAL DATA SOURCE INFORMATION IN THE FORM OF A VISUAL HIERARCHY IN AN ELECTRONIC WORKSPACE

(75) Inventors: Michael B Jetter, Greenbrae, CA (US); Michael S Scherotter, San Rafael, CA (US); Christopher C. Holmes, Menlo Park, CA (US); Stefan Funk, Larkspur, CA (US); Petro Hizalev, San Francisco, CA (US); Steven Bashford, Breunsberg (DE)

(73) Assignee: Mindjet LLC, San Francisco, CA (US)

( * ) Notice: Subject to any disclaimer, the term of this patent is extended or adjusted under 35 U.S.C. 154(b) by 565 days.

(21) Appl. No.: 10/882,556

(22) Filed: Jul. 1, 2004

(65) Prior Publication Data

US 2006/0005164 A1   Jan. 5, 2006

(51) Int. Cl.
| | | |
|---|---|---|
| G06F 17/30 | (2006.01) |
| G06F 17/21 | (2006.01) |
| G06F 17/22 | (2006.01) |
| G06F 17/24 | (2006.01) |
| G06F 3/0481 | (2013.01) |
| G06F 3/0484 | (2013.01) |

(52) U.S. Cl.
CPC ........ *G06F 17/30716* (2013.01); *G06F 3/0481* (2013.01); *G06F 3/0484* (2013.01); *G06F 17/212* (2013.01); *G06F 17/2247* (2013.01); *G06F 17/227* (2013.01); *G06F 17/24* (2013.01)

(58) Field of Classification Search
USPC .................. 715/853, 744, 748, 751, 763, 764
See application file for complete search history.

(56) References Cited

U.S. PATENT DOCUMENTS

| 5,257,185 A | 10/1993 | Farley et al. |
| 5,327,529 A * | 7/1994 | Fults et al. ..................... 715/762 |
| 5,341,223 A * | 8/1994 | Shigeeda et al. ............. 358/440 |
| 5,548,749 A | 8/1996 | Kroenke et al. |
| 5,555,357 A * | 9/1996 | Fernandes et al. ............ 345/441 |

(Continued)

FOREIGN PATENT DOCUMENTS

| EP | 0784263 | 7/1997 |
| WO | WO 03/014965 A2 | 2/2003 |

OTHER PUBLICATIONS

Mindjet MindManager® 2002 for Tablet PC, Mindjet LLC. 2003, pp. 1-8, from URL: https://www.mindjet.com/pdf_eng/MindManager_TPC_QuickGuide.pdf.*

(Continued)

*Primary Examiner* — Steven B Theriault
(74) *Attorney, Agent, or Firm* — Lessani Law Group, PC

(57) ABSTRACT

A system and method enable automatic importation of data from an external data source into an electronic workspace in the form of a visual hierarchy. To display data from a data source, data is retrieved from the external data source, and a visual presentation format for the data is created based on characteristics of the data (e.g., the field to which the data is assigned in the data source, the type of data, the value of the data, etc), where the visual presentation format is hierarchical. The data is then displayed in an electronic workspace in the form of visual hierarchy that is accordance with such visual presentation format. In the electronic workspace, a user can manipulate and supplement the data without affecting the data source, unless there is a trigger event that causes modifications to the data to be written back to the data source.

22 Claims, 13 Drawing Sheets

(56) References Cited

U.S. PATENT DOCUMENTS

| | | | |
|---|---|---|---|
| 5,597,312 A | | 1/1997 | Bloom et al. |
| 5,619,694 A | * | 4/1997 | Shimazu .................... 707/104.1 |
| 5,627,979 A | | 5/1997 | Chang et al. |
| 5,787,417 A | | 7/1998 | Hargrove |
| 5,922,054 A | | 7/1999 | Bibayan |
| 5,948,040 A | | 9/1999 | DeLorme et al. |
| 5,956,708 A | * | 9/1999 | Dyko et al. ........................ 1/1 |
| 5,966,123 A | | 10/1999 | Kaplan |
| 6,037,944 A | * | 3/2000 | Hugh ............................ 715/854 |
| 6,085,187 A | * | 7/2000 | Carter et al. ........................ 1/1 |
| 6,121,971 A | * | 9/2000 | Berry et al. .................... 345/419 |
| 6,148,311 A | * | 11/2000 | Wishnie et al. ............... 715/513 |
| 6,166,739 A | * | 12/2000 | Hugh ............................ 715/854 |
| 6,191,786 B1 | * | 2/2001 | Eyzaguirre et al. .......... 715/853 |
| 6,212,526 B1 | | 4/2001 | Chaudhuri et al. |
| 6,377,287 B1 | * | 4/2002 | Hao et al. ..................... 715/853 |
| 6,405,225 B1 | | 6/2002 | Apfel et al. |
| 6,411,961 B1 | * | 6/2002 | Chen ................................. 1/1 |
| 6,418,426 B1 | * | 7/2002 | Schlesinger .................. 707/610 |
| 6,496,208 B1 | * | 12/2002 | Bernhardt et al. ............ 715/853 |
| 6,507,848 B1 | | 1/2003 | Crosby |
| 6,628,312 B1 | * | 9/2003 | Rao et al. ..................... 715/853 |
| 6,738,964 B1 | | 5/2004 | Zink et al. |
| 6,813,531 B2 | | 11/2004 | Coale et al. |
| 6,888,554 B1 | * | 5/2005 | Decombe ..................... 345/645 |
| 6,901,403 B1 | * | 5/2005 | Bata et al. ........................ 1/1 |
| 6,961,910 B2 | | 11/2005 | Lee et al. |
| 7,080,092 B2 | | 7/2006 | Upton |
| 7,168,035 B1 | * | 1/2007 | Bell et al. ..................... 715/234 |
| 7,181,438 B1 | * | 2/2007 | Szabo ............................. 707/2 |
| 7,188,308 B2 | * | 3/2007 | Weise et al. .................. 715/273 |
| 7,203,667 B2 | * | 4/2007 | Higgins et al. ................ 706/45 |
| 7,203,701 B1 | * | 4/2007 | Packebush et al. .................. 1/1 |
| 7,292,243 B1 | * | 11/2007 | Burke ........................... 345/440 |
| 7,313,766 B2 | * | 12/2007 | Kautto Kiovula et al. .... 715/853 |
| 7,373,612 B2 | * | 5/2008 | Risch et al. .................. 715/850 |
| 7,415,672 B1 | * | 8/2008 | Fortini et al. ................. 715/760 |
| 7,543,299 B2 | | 6/2009 | Goodman et al. |
| 7,627,828 B1 | | 12/2009 | Collison et al. |
| 7,694,272 B2 | * | 4/2010 | Bronicki et al. ............. 717/109 |
| 7,756,907 B2 | * | 7/2010 | Stolte et al. .................. 707/805 |
| 7,849,090 B2 | * | 12/2010 | Sweeney ...................... 707/741 |
| 7,962,433 B1 | | 6/2011 | Heidenreich et al. |
| 8,141,002 B2 | * | 3/2012 | Moses et al. ................. 715/853 |
| 2002/0030703 A1 | * | 3/2002 | Robertson et al. ........... 345/853 |
| 2002/0049689 A1 | | 4/2002 | Venkatram |
| 2002/0049750 A1 | | 4/2002 | Venkatram |
| 2002/0076025 A1 | | 6/2002 | Liversidge et al. |
| 2002/0186238 A1 | * | 12/2002 | Sylor et al. ................... 345/736 |
| 2003/0004746 A1 | * | 1/2003 | Kheirolomoom et al. ........ 705/1 |
| 2003/0033274 A1 | | 2/2003 | Chow et al. |
| 2003/0065650 A1 | * | 4/2003 | Annand et al. .................. 707/3 |
| 2003/0083922 A1 | | 5/2003 | Reed |
| 2003/0110253 A1 | | 6/2003 | Anuszczyk et al. |
| 2003/0137536 A1 | * | 7/2003 | Hugh ............................ 345/744 |
| 2003/0149681 A1 | | 8/2003 | Frees et al. |
| 2003/0154191 A1 | * | 8/2003 | Fish et al. ....................... 707/2 |
| 2003/0204487 A1 | * | 10/2003 | Sssv et al. ........................ 707/1 |
| 2003/0233631 A1 | * | 12/2003 | Curry et al. .................. 717/100 |
| 2003/0234808 A1 | | 12/2003 | Huang et al. |
| 2003/0237046 A1 | * | 12/2003 | Parker et al. ................. 715/513 |
| 2004/0003033 A1 | | 1/2004 | Kamen et al. |
| 2004/0015783 A1 | * | 1/2004 | Lennon et al. ............... 715/523 |
| 2004/0030741 A1 | * | 2/2004 | Wolton et al. ................ 709/202 |
| 2004/0034706 A1 | | 2/2004 | Cohen et al. |
| 2004/0090472 A1 | * | 5/2004 | Risch et al. .................. 345/853 |
| 2004/0093328 A1 | | 5/2004 | Damle |
| 2004/0103071 A1 | * | 5/2004 | Kalia et al. .................... 706/26 |
| 2004/0111431 A1 | * | 6/2004 | Zeller et al. ................ 707/104.1 |
| 2004/0181543 A1 | * | 9/2004 | Wu et al. ...................... 707/102 |
| 2004/0193588 A1 | * | 9/2004 | Tago et al. ....................... 707/3 |
| 2004/0210607 A1 | * | 10/2004 | Manchanda et al. .......... 707/203 |
| 2004/0219493 A1 | * | 11/2004 | Phillips ......................... 434/118 |
| 2004/0236625 A1 | * | 11/2004 | Kearon .......................... 705/10 |
| 2004/0254939 A1 | * | 12/2004 | Dettinger et al. ............. 707/100 |
| 2004/0267753 A1 | * | 12/2004 | Hoche ............................. 707/9 |
| 2005/0038867 A1 | | 2/2005 | Henderson et al. |
| 2005/0060647 A1 | * | 3/2005 | Doan et al. .................... 715/514 |
| 2005/0131924 A1 | * | 6/2005 | Jones ............................ 707/100 |
| 2005/0132305 A1 | * | 6/2005 | Guichard et al. ............. 715/855 |
| 2005/0138160 A1 | * | 6/2005 | Klein et al. ................... 709/223 |
| 2005/0147950 A1 | | 7/2005 | Ortiz et al. |
| 2005/0171746 A1 | * | 8/2005 | Thalhammer-Reyero ........ 703/2 |
| 2005/0283494 A1 | * | 12/2005 | Colossi et al. ................ 707/102 |
| 2006/0004845 A1 | * | 1/2006 | Kristiansen et al. ...... 707/103 R |
| 2006/0095474 A1 | * | 5/2006 | Mitra et al. ................ 707/104.1 |
| 2006/0184886 A1 | | 8/2006 | Chung et al. |
| 2008/0001948 A1 | | 1/2008 | Hirsch |
| 2009/0119584 A1 | * | 5/2009 | Herbst .......................... 715/273 |

OTHER PUBLICATIONS

Software reviews Mindjet MindManager 2002, pp. 181-182, PC Pro Feb. 2002, from URL: http://www.mindjet.com/pdf_eng/PCPROMM2002Review.pdf.*

MindManager ViewerGuide V4.5.782, Mindjet LLC. 2002, pp. 1-6, from URL: http://www.mindjet.com/pdf_eng/MindManager_Viewer_Guide.pdf.*

MindManager® 2002 HelpFile, Mindjet LLC 2002, pp. 1, 9-12, 17, 22-23, 26, 35, 41, 46-47, 57, 61-66, 75-78, 82-84, 91, 105, 152, 157, 166, 178, 180-183, and 190, from URL: http://www.mindjet.com/pdf_eng/MM2002_Help_File.pdf.*

Brian R. Gaines et al.,Concept maps as hypermedia components, International Journal of Human-Computer Studies, vol. 43, Issue 3 (Sep. 1995) Special issue: knowledge-based hypermedia pp. 323-361, ISSN:1071-5819, from URL: http://pages.cpsc.ucalgary.ca/~gaines/reports/HM/ConceptMaps/ConceptMaps.pdf.*

Regev, G., Gilbert, X., Wegmann, A., Collaborative Concept Mapping on the World Wide Web, Proceedings of the Tenth International Conference on Management of Technology (IAMOT 2001), Lausanne Switzerland, Mar. 2001, from URL: http://lamspeople.epfl.ch/regev/Publications/RegevGW01.pdf.*

Mindjet et al. "MindManager 2002 help file" 2002 pp. 1-216.*

Mindjet et. al. MindManager X5 Users guide Oct. 28, 2003; pp. 1-168.*

Jodef Jelinek and P. Slavek, "XML Visualization Using Tree Rewriting," Proceedings of the 20th Spring Conference on Computer Graphics, Apr. 22, 2004, Slovakia, XP002444098.

J. DelahouSsE "Index and knowledge drawing: a natural bridge from Topic Maps to XML SVG," XML USA [online at www.ideaalliance.org/papers/xml2]Dec. 9, 2001, XP-002444099.

Lu, Yiling, Roadmap for tool support for collaborative ontology engineering, University of Victoria, 2003, pp. 1-119.

Spanger, S., et al., "Mindmap: Utilizing Multiple Taxonomies and Visualization to Understand a Document Collection," Proceedings of the 35th Annual Hawaii International, 2001.

* cited by examiner

| PRODUCTS (310) | NOTES (320) |
|---|---|
| Journal | • Use for sketching<br>• Use for water coloring |
| Pencil | |
| Fountain Pen | • Namiki<br>• Mount Blanc |

Figure 3

| PRODUCTS (310) | NOTES (320) |
|---|---|
| Leather Journal | • Use for sketching<br>• Use for water coloring |
| Fountain Pen | • Namiki<br>• Mount Blanc<br>• Lamy |

Figure 6

| Fig. 7A | Fig. 7B | Fig. 7C |

FIG. 7B

```
☐ Contact: Ms. Jane Grey ~ salesforce.com – Developer Edition – Microsoft Explorer pr...
File  Edit  View  Favorites  Tools  Help
[Back] [Forward] [Stop] [Refresh] [Home] | [Search] [Favorites] [Media] [History] | [✉] [🖨] [✎]
Address: http://ra1-api.saleforce.com/00330000001Ud8v  [▽] [→] Go
Google ▾ [                    ] [▽]  🔍 Search Web ▾   ?   🖨 40 blocked   ☰ ???   »
```

| cts | Opportunities | Forecasts | Cases | Documents |

New Acount | New Contact | New Opportunity | New Forecast | New C

Org Chart: Jane Grey          *710*

[ Edit ]  [ Delete ]  [ Clone ]

| Contact Owner: | Micheal Scherotter [Change] |
| Name: | Ms. Jane Grey |
| Account: | University Of Arizona |
| Title: | Dean of Administration |
| Department: | Administration |
| Birth Date: | 8/26/1932 |
| Reports To: | [View Org Chart] |
| Lead Salute: | Word Of Mouth |
| Friends With: | |
| Mailing Address: | 888 N Eudid<br>Hallis Center, Room 501<br>Tucson, AZ 85721<br>United States |
| Languages: | English |
| Created By: | Micheal Scherotter, 10/7/2003 3:23 PM |
| Description: | |
| Listed Links: | |

Internet

FIG. 7C

| Solutions | Products | Relationship | Leads | Con | htract | New Case | New Solution | New Document | New Mask | New

*710*  [Customize Page]  (?) Help

[Printable View]  [Request Update]

- Phone: (520) 773-9050
- Home Phone:
- Mobile: (520) 773-4539
- Other Phone:
- Fax: (520) 773-9060
- E-mail: jane_grey@uoa.edu
- Assistant:
- Assist Phone:
- 
- Other Address:
- Level: Primary
- Last Modified By: Michael Scherotter, 10/7/2003 3:23 PM Map Org Chart

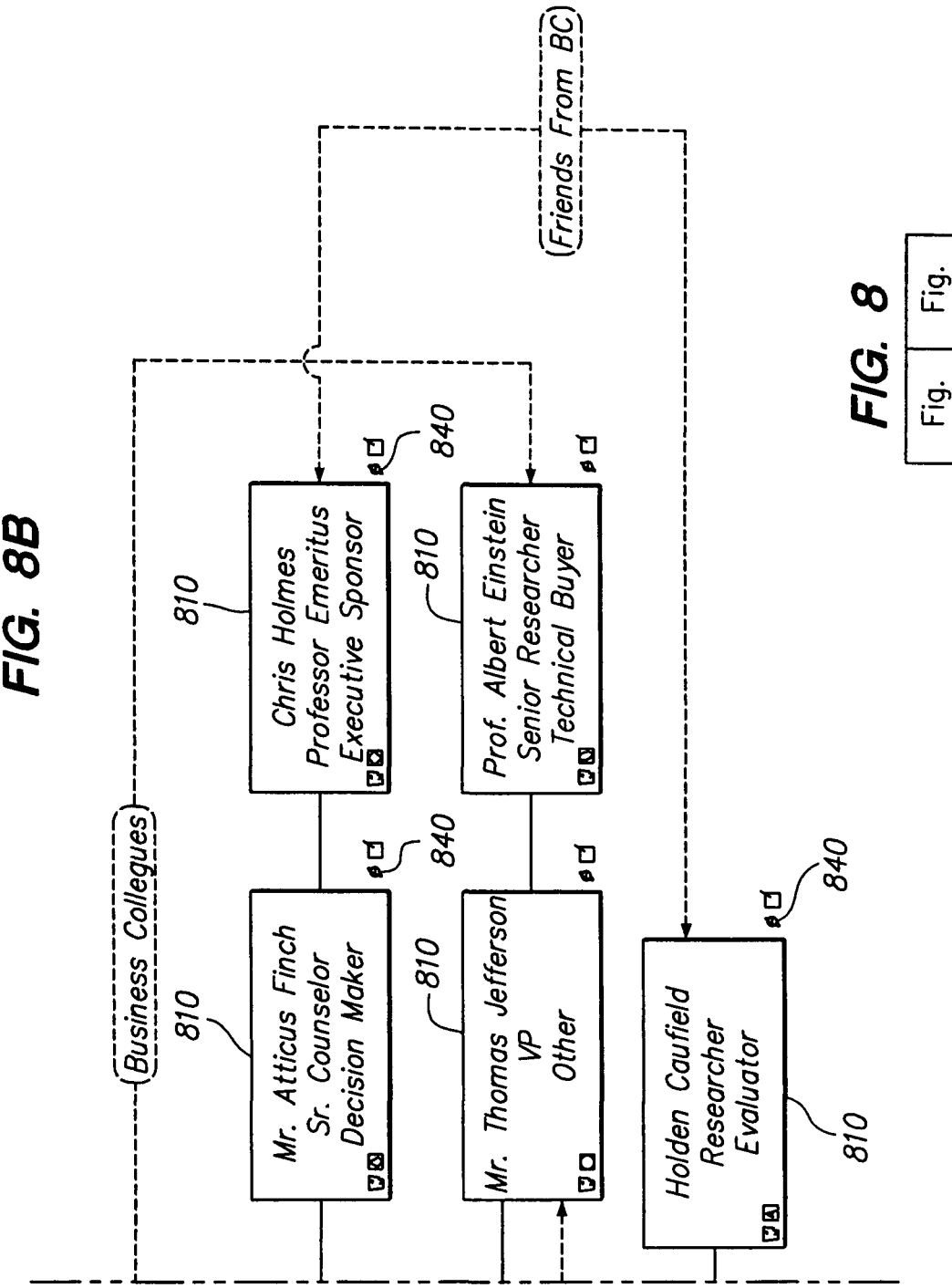

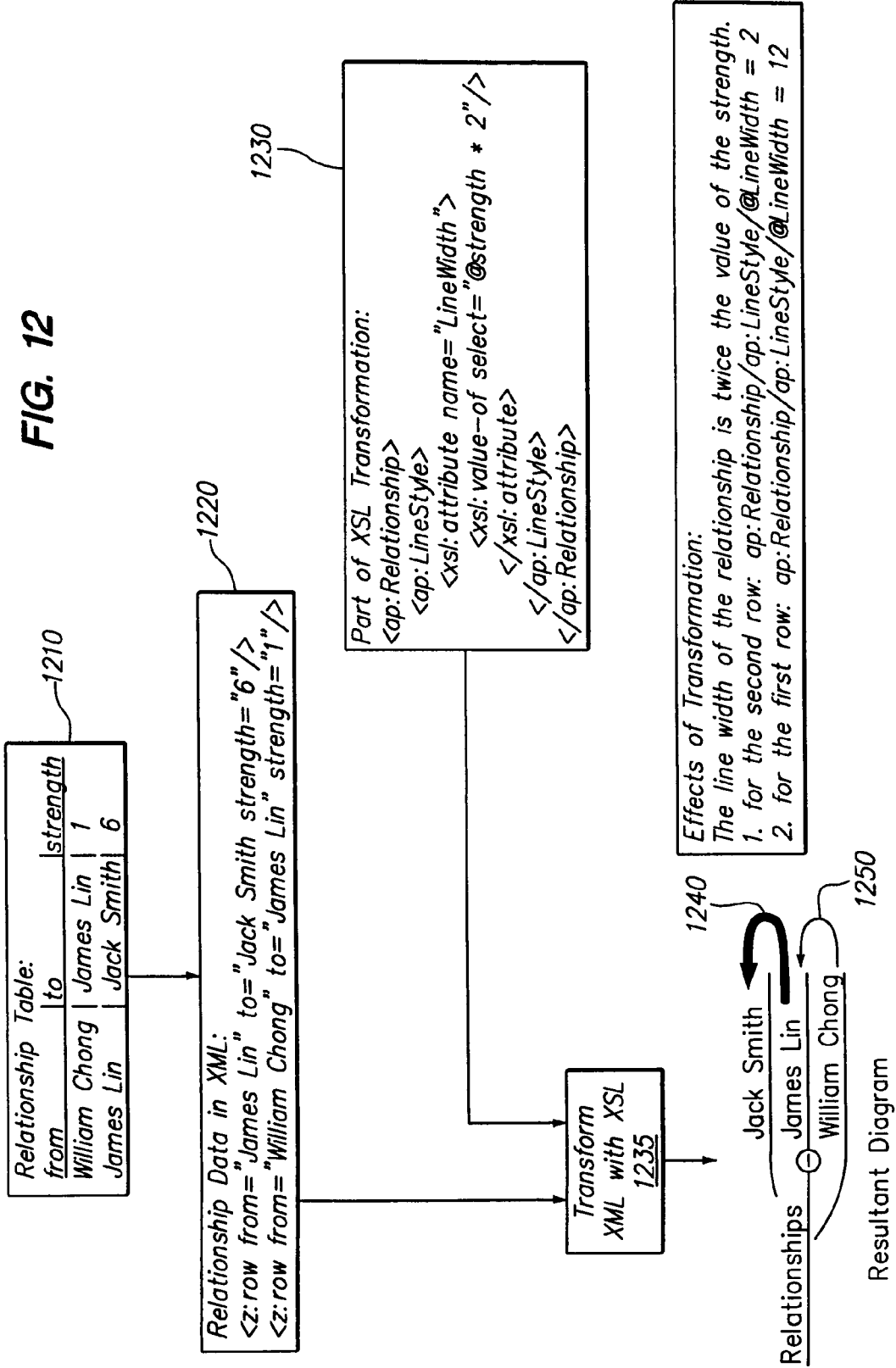

SYSTEM AND METHOD FOR GRAPHICALLY ILLUSTRATING EXTERNAL DATA SOURCE INFORMATION IN THE FORM OF A VISUAL HIERARCHY IN AN ELECTRONIC WORKSPACE

BACKGROUND OF THE INVENTION

1. Field of the Invention

This invention relates generally to visual display of information on an electronic medium, and more specifically to enabling a user to view external data source information in the form of a visual hierarchy and manipulate the data in an electronic workspace.

2. Description of the Background Art

Depicting information often makes it easier to understand and process the information. One known way to illustrate data is through visual hierarchies that graphically illustrate relationships between data items. An example of a visual hierarchy is a "mind map," which is generally organized in a radial hierarchical fashion, with subnodes extending from a parent node. FIG. 1 illustrates an example of a mind map.

There are known computer programs that provide users with a workspace in which they can create visual hierarchies and manipulate such hierarchies. Such programs are often used as tools to facilitate discussions in that information can be easily grasped and manipulated in such an environment. In such known programs, data is manually entered into the visual hierarchy in the workspace. This can be time consuming and can duplicate data entry when the data is already stored in another data source. Therefore, it is desirable to be able to automatically import and display data from a data source into the workspace in the form of a visual hierarchy. It is also desirable to enable a user to modify, add to, or delete the data source information in the workspace and to enable the user to determine whether or not such changes are reflected in the data source itself.

SUMMARY OF THE INVENTION

The present invention enables a user to automatically import data from an external data source into an electronic workspace in the form of a visual hierarchy. This can occur in the context of a software application which provides a user with an electronic workspace. Within the electronic workspace, a user is able to construct a visual hierarchy, where, to do so, a user can manually enter information into the workspace or automatically import information into the workspace from an external data source in accordance with the present invention. A user can then re-organize the information or add, edit, or delete information. In one embodiment of the present invention, the user is able to write the information in the visual hierarchy back to an external database, which can be the database from which information was originally imported or another database (or databases).

When a user inputs a command to import data from an external data source, data is retrieved from the external data source, and a visual presentation format for the data is created based on characteristics of the data (e.g., the field to which the data is assigned in the data source, the type of data, the value of the data, etc.). The data is then displayed in the form of a visual hierarchy in accordance with such visual presentation format. In one embodiment, the visual hierarchy is a radial hierarchy, such as a mind map. Other visual hierarchies include organizational diagrams and fishbone diagrams.

The visual presentation format defines how information is to be displayed in any visual display based on such format. It is hierarchical (e.g., a hierarchical object model) in that at some level some core data is categorized in a hierarchical manner. Creating the visual presentation format entails applying rules that specify how the data is to be categorized hierarchically and how to present certain data types or data values.

The data (in the form of a visual hierarchy) is displayed in the electronic workspace. Absent the occurrence of an event designated to trigger the writing of data to the external data source, a user is able to edit or supplement the data in the electronic workspace without affecting the external data source. In this way, a user can manipulate the external data source information without necessarily overriding the original data. An electronic workspace may be any computer-generated, graphical user interface in which a user can view and manipulate (i.e., add, edit, and delete) data.

As stated above, in a further embodiment of the present invention, edits made to the data source data in the workspace can be written back to the data source. In this way, a user is able to interface with the data source through the workspace. A select trigger event, such as user inputting a command, causes data from the workspace to be written to the data source. When such a trigger event occurs, a software module determines whether any changes have been made to applicable portions of the visual hierarchy (i.e., those portions that include data that can be written to a data source). If so, the rules, which are essentially the inverse of the rules applied to create the visual presentation format, are used to convert the data (which is stored in a visual presentation format) back to the data source format. The modified data is then written back to the data source.

BRIEF DESCRIPTION OF THE DRAWINGS

FIG. 3 is an example of a database table.

FIG. 6 is an example of a database table based on the visual hierarchy in FIG. 5.

FIG. 12 is a diagram that explains an example of the Style and Formatting component of the Data Processing module.

DETAILED DESCRIPTION OF THE PREFERRED EMBODIMENTS

1. Overview

The present invention enables a user to automatically import data from an external data source into an electronic workspace in the form of a visual hierarchy. This can occur in the context of software application which provides a user with an electronic workspace. Within the electronic workspace, a user is able to construct a visual hierarchy, where, to do so, a user can manually enter information into the workspace or automatically import information from an external data source in accordance with the present invention. A user can then re-organize the information or add, edit, or delete information. In one embodiment of the present invention, the user is able to store the information in the visual hierarchy in an external database, which can be the database from which information was originally imported or another database (or databases)

Figure 1:
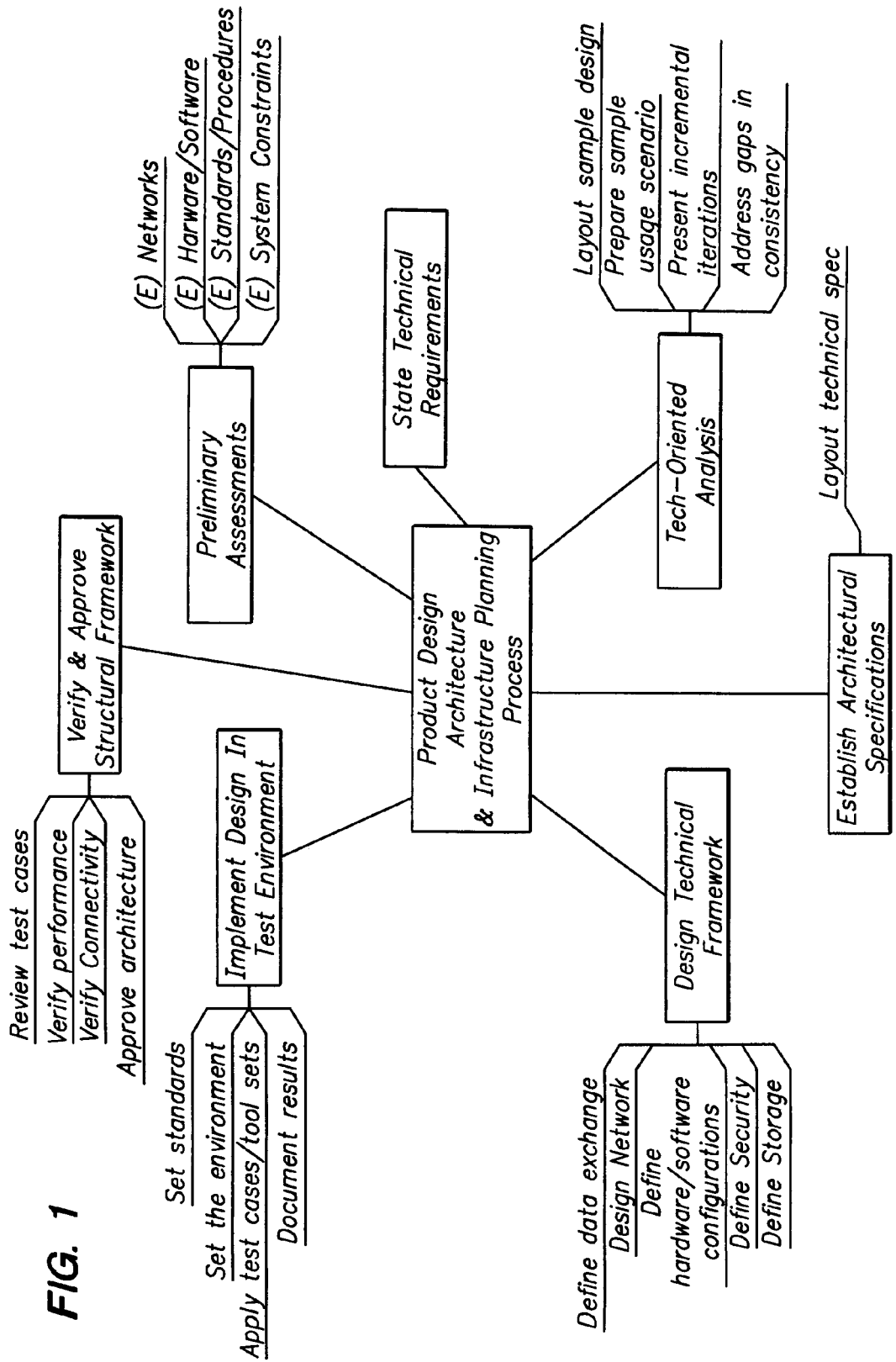
FIG. 1 illustrates an example of a mind map.
Figure 2:
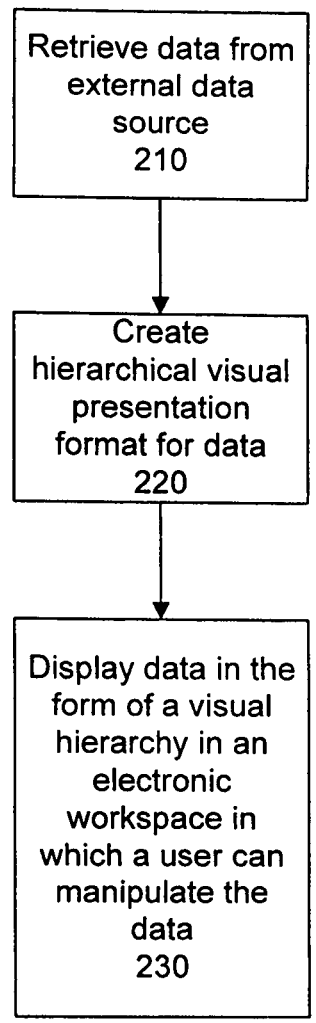
FIG. 2 illustrate a method, according to one embodiment of the present invention, for displaying information from an external data source in an electronic workspace in the form of a visual hierarchy.

FIG. 2 illustrates a method of the present invention. When a user inputs a command to import data from an external data source, the data is retrieved 210 from the external data source, and a visual presentation format for the data is created 220 in software code based on characteristics of the data (e.g., the field to which the data is assigned in the data source, the type of data, the value of the data, etc.). The data is then displayed 230 in the form of a visual hierarchy in accordance with such visual presentation format.

Furthermore, the data (in the form of a visual hierarchy) is displayed in an electronic workspace that, absent the occurrence of an event designated to trigger a write of data to the data source, enables a user to edit or supplement the data without affecting the external data source. An electronic workspace may be any computer-generated, graphical user interface in which a user can view and manipulate (i.e., add, edit, and delete) data. An electronic workspace includes the following attributes: (1) it is persistent in that a particular instance of a workspace can be "saved" to a persistent media and, when reopened, appear to be identical to the one that was saved; and (2) it supports direct manipulation of graphical elements with user interface tools, such as keyboards, digital pens, and mice. Examples of applications that provide electronic workspaces are Mindjet's MindManager, Microsoft Word, Microsoft Visio, Microsoft Excel, and Microsoft PowerPoint.

The visual presentation format defines how information is to be displayed in the electronic workspace. It is hierarchical (e.g., a hierarchical object model) in that at some level the data is categorized in a hierarchical manner. Creating the visual presentation format entails applying rules that specify how the data is to be categorized hierarchically and how to present certain data types or data values. The rules may associate certain data characteristics with select graphical features, such a particular line colors, fill colors, text colors, geometric shapes, icons, line styles, and text formatting.

The visual presentation format is different from the format in which the data is stored in the data source. In one implementation of the invention, the rules are encoded in Extensible Style Language Transformation (XSLT) language, which is used to convert XML data from a data source into a different XML data format for the visual hierarchy (where this different XML data format is the visual presentation format). However, those skilled in the art will appreciate that alternate software languages may be used.

Information may be retrieved from various types of external data sources, such as software applications (e.g., Microsoft Word, Microsoft Outlook, Microsoft Project, Microsoft PowerPoint), web services (e.g., salesforce.com, Google, Groove), databases (e.g., CRM, ERP, ECM), websites (e.g., online knowledge bases), and file systems. Information can be retrieved from multiple data sources and merged into one hierarchical data format. Multiple data sources could range from multiple records in a single data source (e.g. one single CRM system), to multiple record sets coming from multiple independent systems (e.g. a CRM system and an online knowledge base).

In a further embodiment of the present invention, edits made to the data source data in the workspace can be written back to the original data source or another data source (including multiple data sources) upon the occurrence of a select trigger event. Ways to modify the data include changing the structure of the visual hierarchy (i.e., add, deleting, or moving nodes) and editing existing data-source data in the hierarchy. When an applicable trigger event occurs, a software module determines whether any changes have been made to applicable portions of the visual hierarchy (i.e., those portions that include data that can be written to a data source). If so, rules, which are essentially the inverse of the rules applied to create the visual presentation format, are used to convert the data (which is stored in a visual presentation format) back to the data source format. The modified data is then written back to the data source. Types of trigger event are discussed in more detail below, but can include the inputting of a command by a user (such as a user clicking on an icon or pressing a button).

2. Examples

Figure 4:
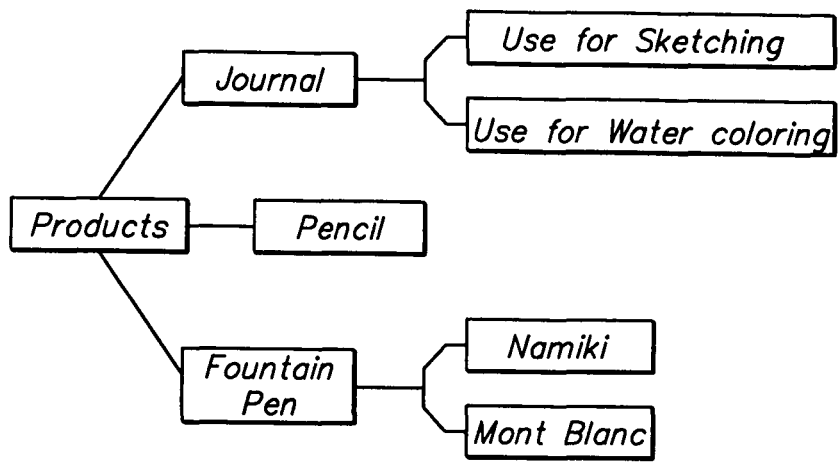
FIG. 4 is an example of a visual hierarchy based on the database table of FIG. 3.
Figure 5:
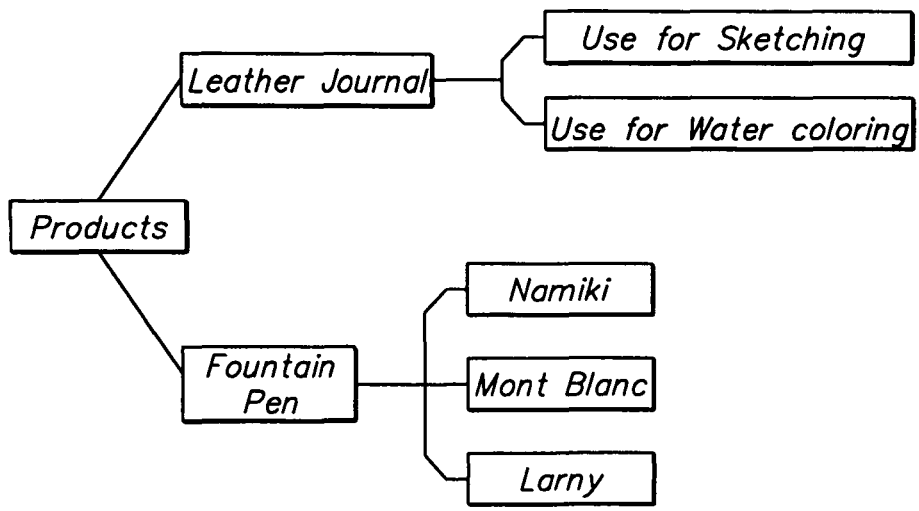
FIG. 5 is a modified version of the visual hierarchy illustrated in FIG. 4.

FIG. 3 illustrates a simple database table which includes a column 310 labeled "Products" and a column 320 labeled "Notes" for notes associated with the products. In other words, Products and Notes are the two types of data fields in the database. FIG. 4 illustrates a visual hierarchy (in particular, a mind map) of the database information generated in accordance with one embodiment of the present invention in an electronic workspace. In the workspace, a user can modify the data without affecting the database illustrated in FIG. 3, unless a trigger event meant to initiate a write connection with the external database occurs. FIG. 5 illustrates the hierarchy after a user has made modifications to it. The modifications are the deletion of "Pencil" from the product category, changing "Journal" to "Leather Journal", and adding "Lamy" as a note to "Fountain Pen." In one embodiment, upon the occurrence of a designated trigger event, the modifications are written back to the data source. FIG. 6 illustrates the changes made to the database after this happens.

Figures 7, 7A:
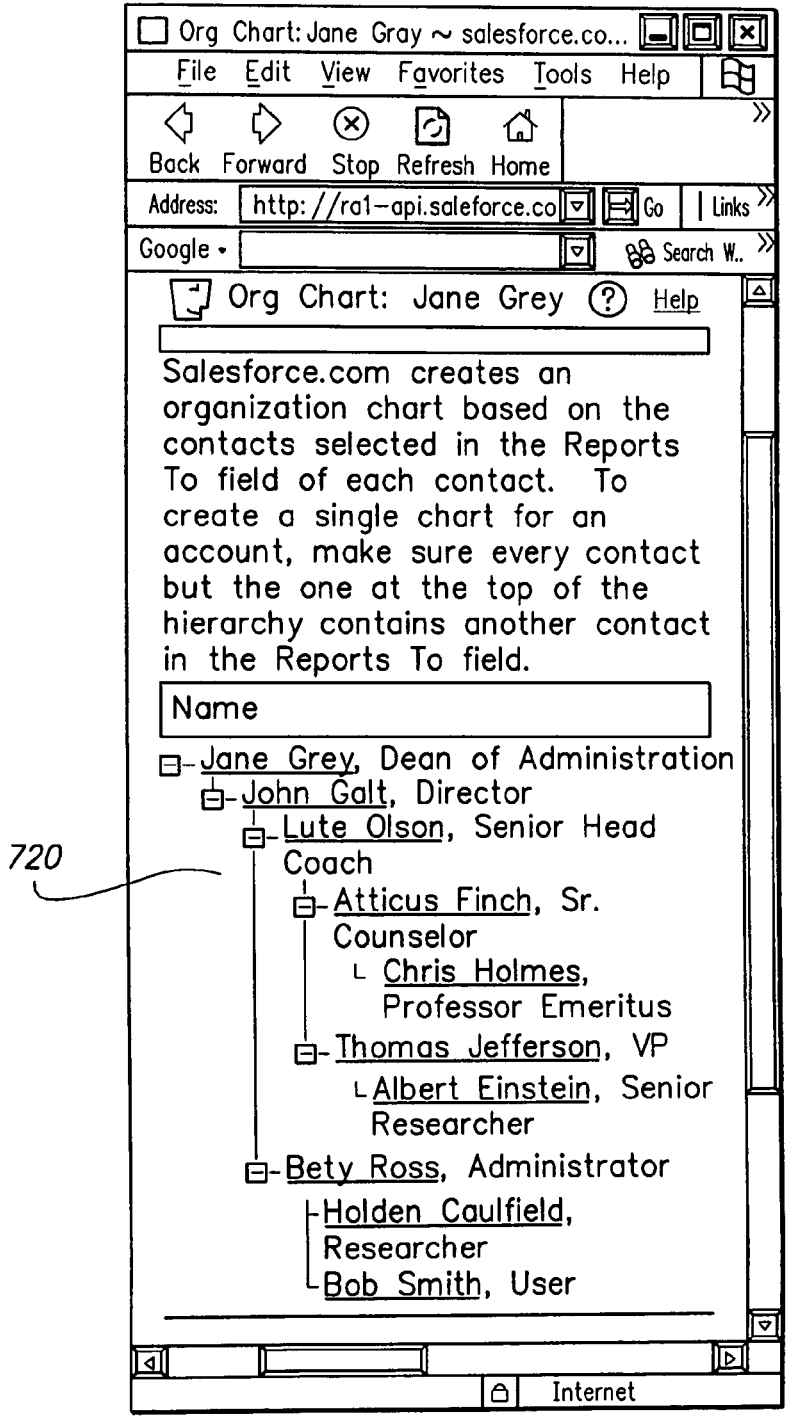
FIG. 7 is an example of data in an external data source.

FIG. 7 is an example of a typical textual user interface to an external database. In this example, the external database includes contact and organizational chart information, where screen 710 is the contact information for Ms. Jane Grey and screen 720 illustrates the organizational chart associated with Ms. Jane Grey. A Salesforce.com interface is shown but the present invention could work with any number of data sources.

Figure 8A:
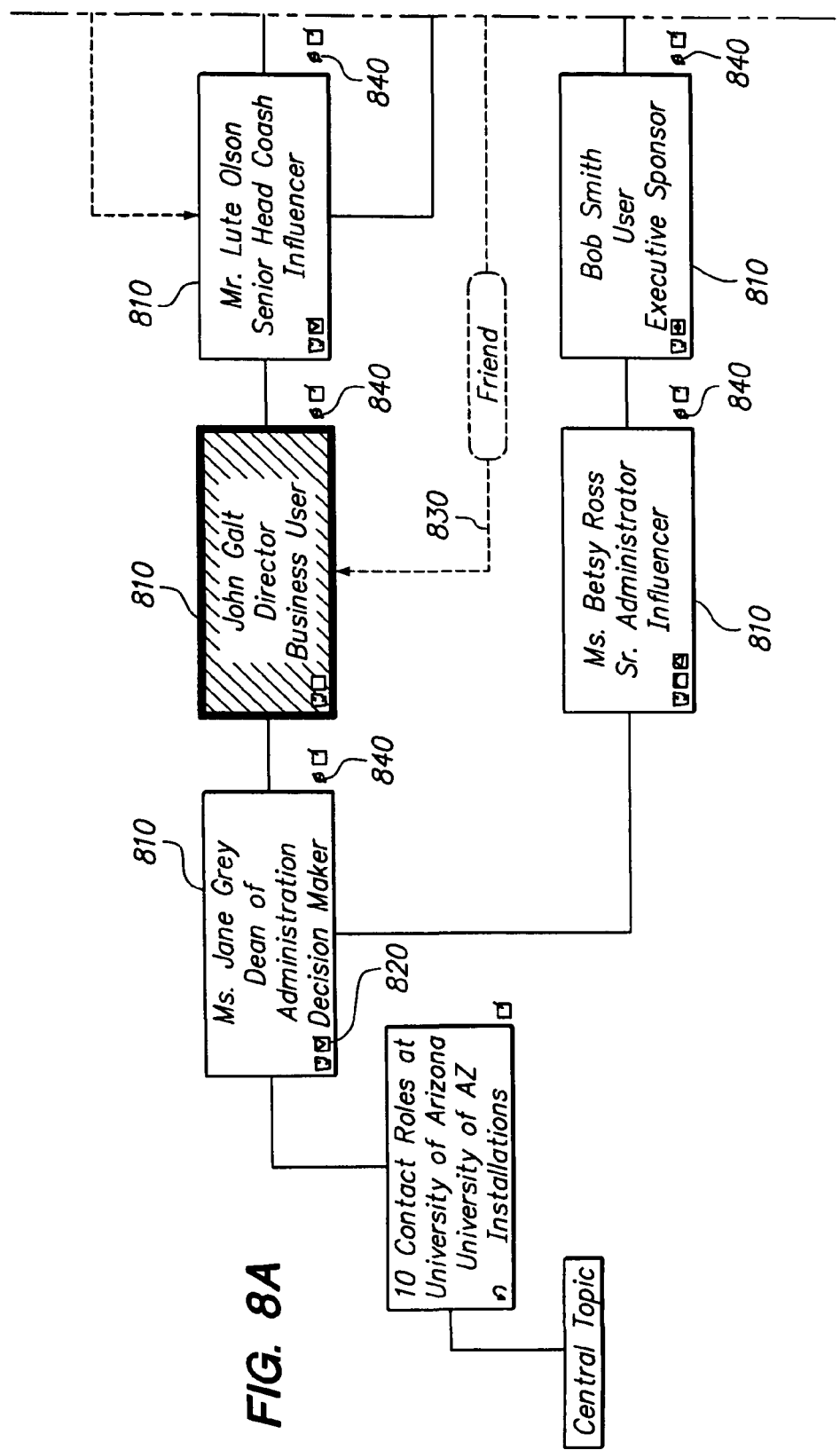
FIG. 8 is an example of a visual hierarchy of the organizational chart information depicted in FIG. 7.

FIG. 8 illustrates one way in which the present invention can display the external contact information and the organizational chart information shown in FIG. 7 in a visual hierarchy. Each node is associated with one person in the organization chart, and the nodes are arranged in a hierarchy that reflects the hierarchy of the organizational chart. Each node 810 includes information from the contact record of the person associated with that node. The illustrated nodes 810 include information from the "name" and "title" fields of the applicable contact record. Database information is also represented by graphical icons, shading (i.e., fill color), and line width. For instance, in this example the check-mark-in-a-box icon 820 represents that someone is a decision maker, the shading in the John Galt node indicates that he has been previously contacted, and the bold line around the John Galt node indicates that he is the primary contact. Because the visual presentation format for this visual hierarchy is hierarchical (i.e., the data is stored in a hierarchical format), the copying or deletion of a node 810 will also copy and delete the subnodes of that node.

The present invention can also illustrate non-hierarchical relationships between data items. For instance, the database associated with FIG. 7 includes a "friends with" field and a dotted line is used to visually depict a friendship association. The amount of detail illustrated in the visual hierarchy can also vary. By clicking on the Internet explorer icon 840, the entire contact information associated with node can be displayed. The other icons illustrated are associated with other types of information (such as user notes). Also, the hierarchy can be contracted and expanded by using the plus and minus buttons to show and hide information.

Figure 9:
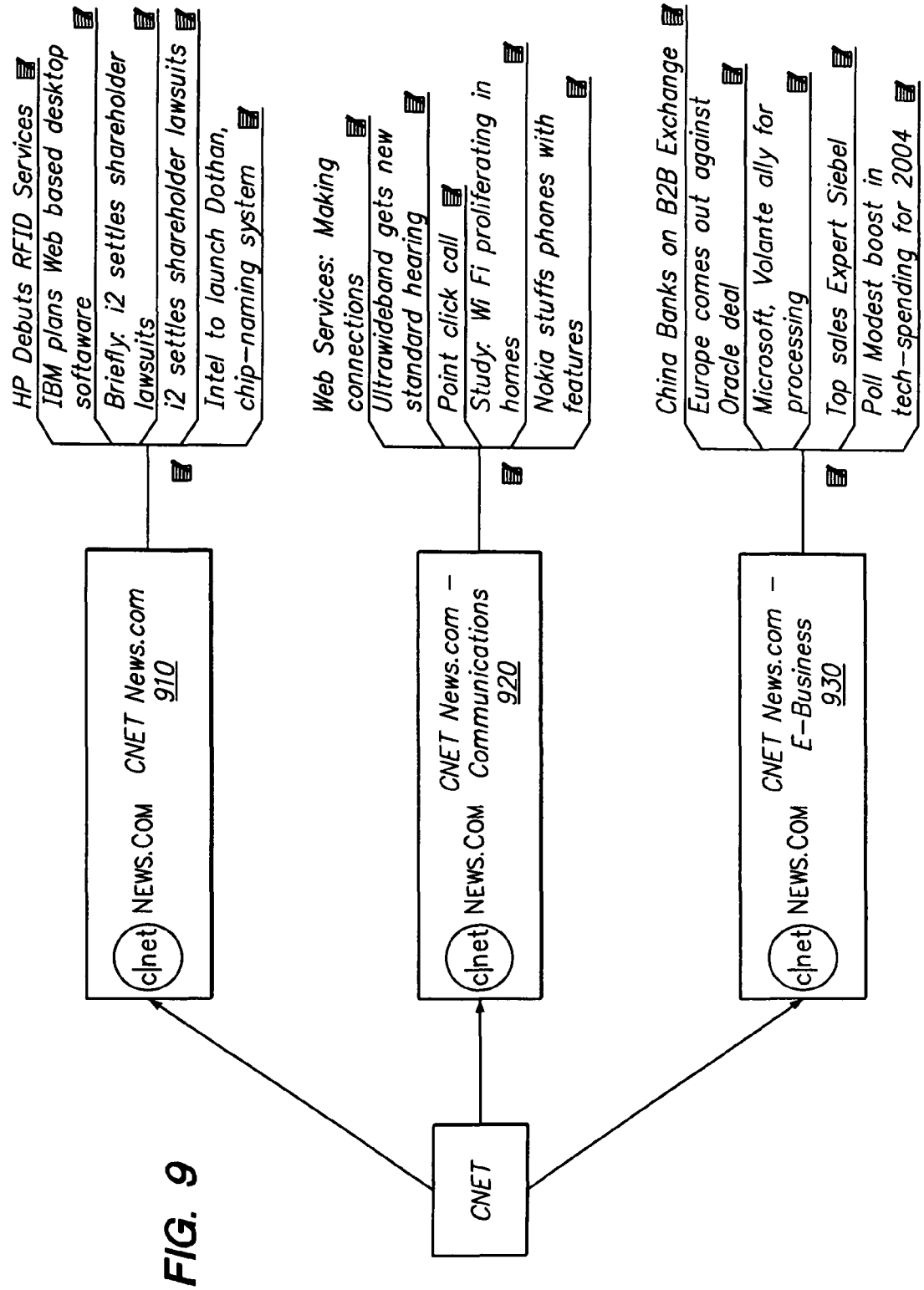
FIG. 9 is an example of a visual hierarchy created from website content.

FIG. 9 illustrates an example of how the present invention may be used to retrieve information from a website and display it in the form of a visual hierarchy in an electronic workspace. In this example, CNet article titles are retrieved from the CNet website and organized by subject area. CNet articles that related to general news items are displayed as subtopics of node 910, articles that relate to communications are displayed as a subtopic of node 920, and articles that related to e-business are displayed as a subtopic of node 930. In one embodiment, the article titles or icons adjacent article titles can be hyperlinks to the actual articles.

3. Software Implementation Embodiment

Figure 10:
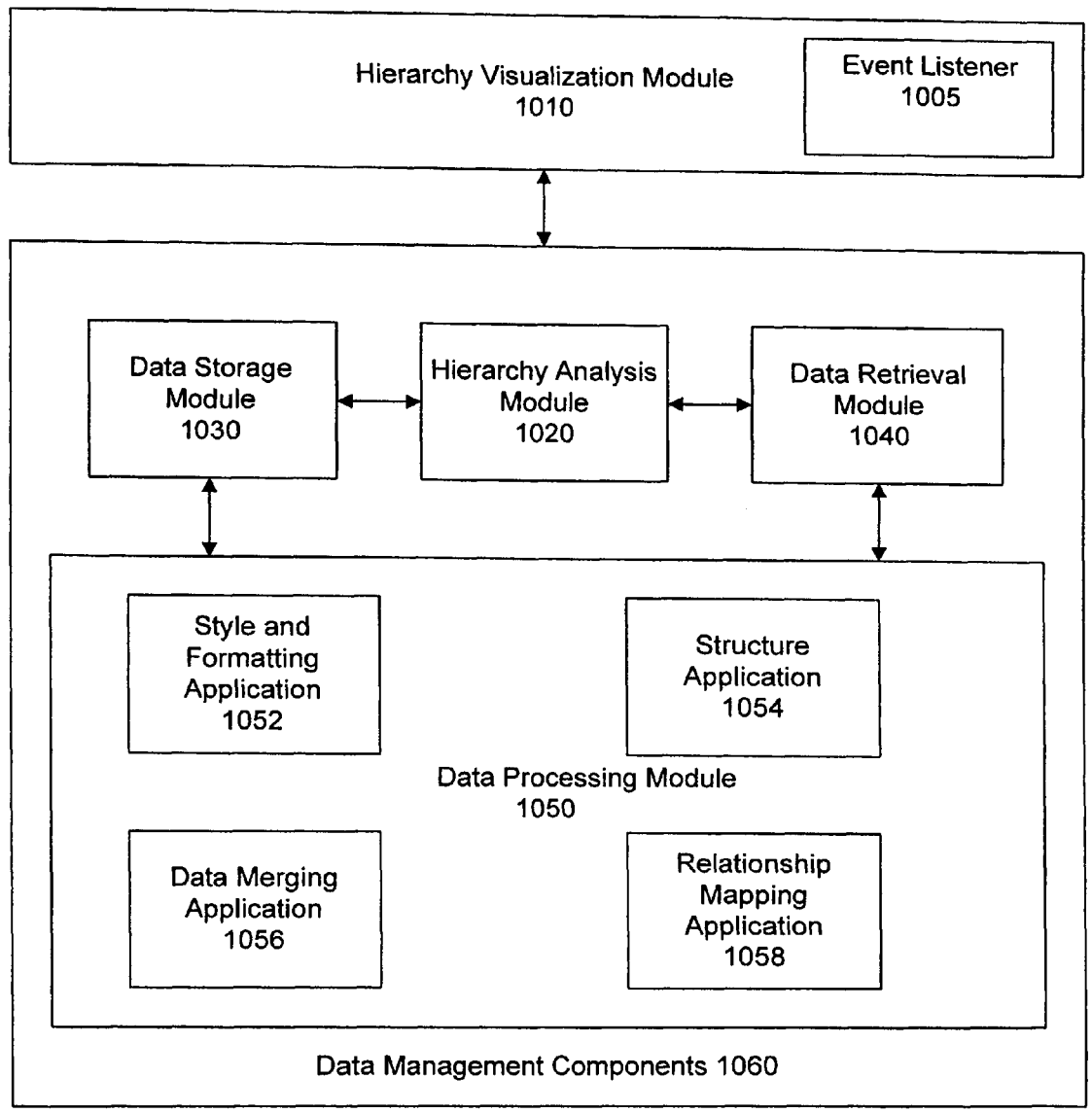
FIG. 10 is a block diagram of software modules that, according to one embodiment of the invention, implement the functionality of the present invention.

The present invention may be implemented in software. For ease of explanation, the software can be thought of as divided into various functional modules which are illustrated in FIG. 10. Such modules include the Hierarchy Visualization module 1010, the Hierarchy Analysis module 1020, the Data Storage module 1030, the Data Retrieval module 1040, and the Data Processing module 1050.

The Hierarchy Visualization module 1010 stores data in a hierarchical format and enables creation of visual hierarchies (e.g., mind maps) in an electronic workspace in which a user can input, modify, or delete data. Software that performs the functionality of the Hierarchy Visualization module 1010 is known, and an example of such software is Mindjet's MindManager software. The Hierarchy Visualization module 1010 includes an Event Listener component 1005 which detects the occurrence of select events. The Event Listener component 1005 may be implemented using known techniques for creating event loop modules that detect the occurrence of events in software programs.

The Data Retrieval module 1040 and the Data Processing module 1050 enable a user to import data from an external data source into the workspace of the Hierarchy Visualization module 1010. The Hierarchy Analysis 1010 and Data Storage modules 1030, in association with the Data Processing module 1050, enable a user to write data changes back to the data source. For reference, the Data Retrieval 1040, Data Processing 1050, Hierarchy Analysis 1020, and Data Storage 1030 modules are referred to herein as "Data Management Components" 1060.

When triggered, the Data Management Components 1060 retrieve information from the data source and, for particular trigger events, store modifications to the visual hierarchy to the data source. There are several events that could trigger the operation of the Data Management Components 1060. They include the following:

1. User Initiates Data Retrieval
   a. User adds a "connection part" to an existing hierarchy. A "connection part" is the part of the visual hierarchy that interfaces with an external database and pulls in data from the external database. The entire visual hierarchy can be a connection part (as is the case with FIG. 8) or just a portion of the visual hierarchy. The user interface generated by the Hierarchy Visualization module 1010 can include a command (which may be in the form of an icon or library element that the user selects) that enables a user to add a particular connection part to the visual hierarchy. This is a trigger event that is associated with retrieval of information from an external data source.
   b. User creates a new interface part. A user may be able to convert an existing node in a visual hierarchy to a connection part. For instance, a node with a hyperlink could be converted to a connection part, where, upon conversion, data from the data source to which the hyperlink points would be pulled in to the visual hierarchy. This is a trigger event that is associated with retrieval of information from a data source.
   c. User triggers a refresh action manually. The user executes a command to refresh the connection part. This is a trigger event that may be associated with both the retrieval of information from a data source and the storage of information to the data source.
2. External Event
   a. Passing of a time interval. The Data Management Components can be configured to automatically trigger at certain time intervals, such as on each hour, on the start of each day, on the start of each month, etc.
   b. Passing of a specific time and date. The Data Management Components can be configured to automatically trigger upon the passing of a specific time and date.
   c. Updating of the Data Source. The Data Management Components can be configured to automatically trigger whenever the data in the applicable data source is updated.

Depending on the implementation desired, the above external-event triggers can be associated with just retrieval of information or both retrieval and storage of information from and to the data source, respectively.

Figure 11:
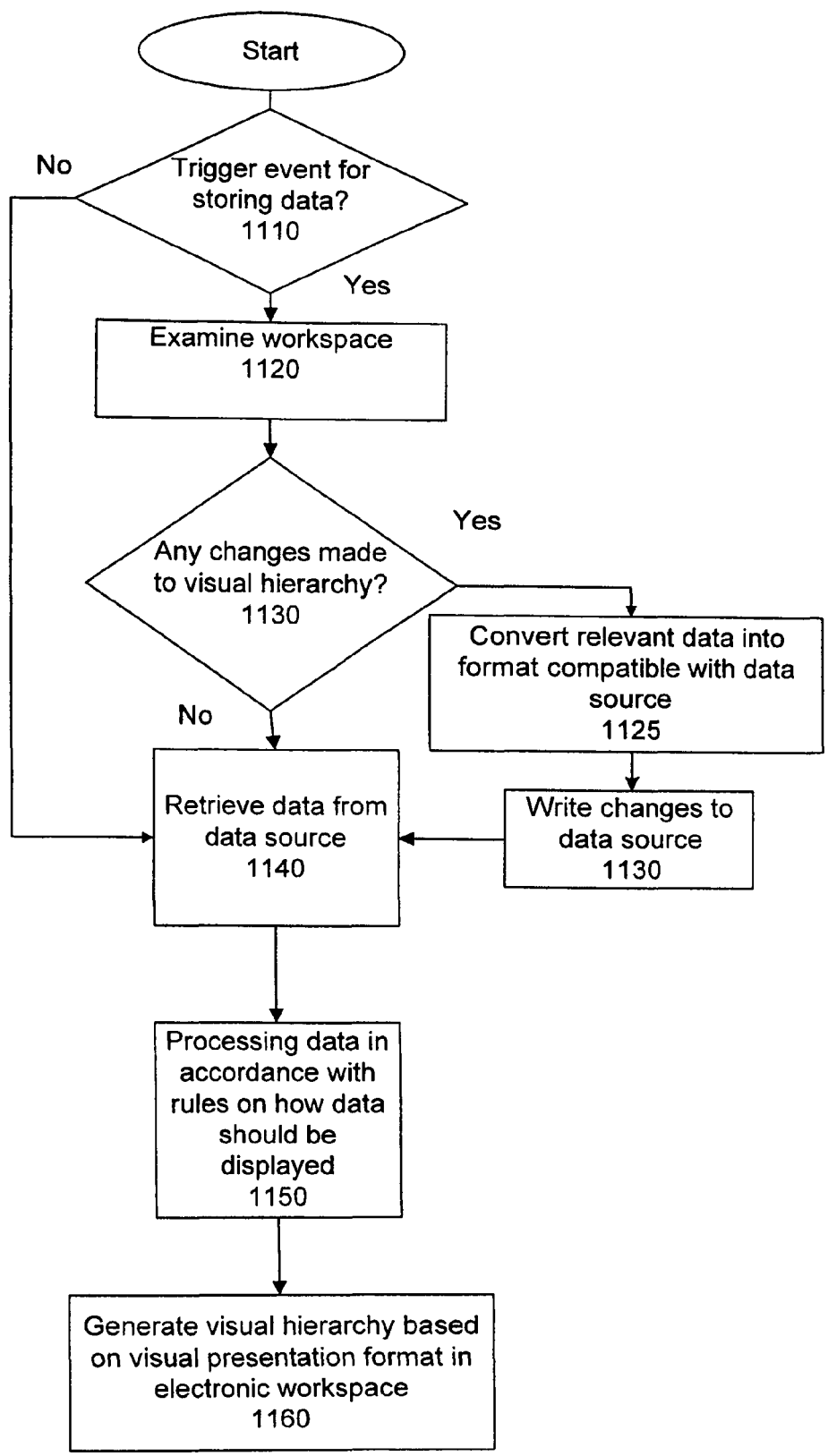
FIG. 11 is a flow chart that illustrates the operation of software modules according to one embodiment of the present invention.

FIG. 11 illustrates the operation of the Data Management Components when they are triggered. To illustrate the overall method, the steps are shown in a flow chart. However, those skilled in the art will appreciate that the Data Management Components do not necessarily operate in series and some of the steps illustrated in the flow chart can happen in parallel.

Upon the triggering of the Data Management Components, the Hierarchy Analysis Module 1020 determines 1110 whether or not the trigger event is associated with storing information from the workspace to the data source. If so, it examines 1020 the workspace and determines 1125 whether or not any changes have been made to applicable portions of the visual hierarchy since the last refresh cycle. If changes have been made, the Data Storage 1030 module, which includes an API that enables it to communicate with the data source, is activated. Upon activation, the Data Storage module 1030 triggers the Data Processing Module 1050, which converts 1125 the applicable data into a format compatible with the data source. After such conversion, the Data Storage module 1030 writes 1130 the relevant data back to the data source by sending the applicable data and an appropriate write request to the data source.

Once this is done, or if no changes were made to the data, or if the trigger event is associated only with retrieval of information, the Data Retrieval module 1040 is activated. The Data Retrieval module 1040 connects to the data source and retrieves 1140 the applicable data by sending a request to the data source. As stated above, the data source could be a service, a document, a database, a desktop application, or a server application. The Data Retrieval component 1040 includes an API that enables it to interface with the API of the data source and request data from the data source. In response to receiving the request, the data source transmits the data to the Data Retrieval module 1040 (via a network if the data source is remote from the computer on which the Data Retrieval component resides), and once it receives the data, the Data Retrieval component 1040 activates the Data Processing module 1050.

The Data Processing Module 1050 processes 1150 the data in accordance with defined rules on how the data should be displayed, thereby creating a visual presentation format for the data. Once this is done, the data is passed to the Hierarchy Visualization module 1010 which generates 1160 a visual-hierarchy of the data based on the visual presentation format in an electronic workspace.

The Data Processing Module 1050 includes several sub-components which work in parallel or in series to synthesize the retrieved data into a format that can be visualized. Examples of the types of subcomponents in a Data Processing Module 1050 include a Style and Formatting application 1052, a Structure application, a Data Merging application 1056, and a Relationship Mapping application 1058.

The Style and Formatting application 1052 applies style and formatting rules to the data to create a visual representation of it. For instance, there may be rules to format certain fields in a database certain ways. The Style and Formatting application 1052 essentially associates certain data types or data values with certain style and formatting graphical features. The Style and Formatting application 1052 may be in the form of a transformation language, such as XSLT, in which the rules are encapsulated within XSLT code. XSLT is a software language that transforms one tree-shaped XML data hierarchy into another tree-shaped XML data hierarchy. The rules that the Style and Formatting component, as well as any other Data Processing component, apply can be customized to the suit the needs of a particular user. It is just a matter of encoding the rules in the appropriate software language.

FIG. 12 provides an explanation of an example of the Style and Formatting application 1052. In this example, a relationship table 1210 from an external database contains a numerical indication of the strength between parties in the database. The database table indicates that the relationship between James Lin and Jack Smith is about six times stronger than the relationship between William Chong and James Lin. The relationship information is stored in XML format. The Style and Formatting takes this XML data 1220 and applies 1235 appropriate rules to it, which in this case are embodied in XSLT code 1230 and specify that the line width should be set to twice the value of the variable "strength." The effect on a graphical display is that there is a 12 point line width for the arrow 1240 connecting Jack Smith and James Lin and a 2 point line width for the arrow 1250 between James Lin and William Chang.

Types of style and formatting graphical features include, but are not limited to:
  text size, color, font, boldness, italicizing
  line color, fill color
  symbols (e.g., icons)
  shapes
  images
  shading (i.e., fill colors)
  line width, style, end-point The Structure application 1054 determines how data from a data source is organized, sorted and filtered based on its content. It determines the hierarchy of the visual hierarchy. For clarity, the term "visual hierarchy" does not necessarily mean that all the information is arranged in a hierarchy or that the content of each node is hierarchical, but that there is at least a hierarchical arrangement of some nodes and all other information is displayed in relationship to this hierarchy.

Specific data types, data values or combinations of values can be organized into the following visual elements:
  Topics and Subtopics
  Relationships
  Callouts
  Floating Topics
  Review Comments
  Hyperlinks
  Text Notes
  Task Planning Information Examples of rules within the Structure application 1054 that could apply to the data illustrated in FIG. 8 include:
  Each person in the organizational chart is a separate node.
  Each node includes information from the "name" and "title" fields in the Contacts record of the Salesforce.com database.

When data comes from multiple sources or processes, the Data Merging application 1056 synthesizes the information. The Data Merging application 1056 includes rules that specify how the data is merged and combined into a single visual representation.

When data is assembled, non-hierarchical relationships between data entities can be graphically depicted. Such depictions overlay the dominant hierarchical organization with additional meaning. The Relationship Mapping application 1058 applies rules that specify how such relationships are illustrated. For instance, in the example illustrated in FIG. 8, there is a rule that specifies that, if the Contact record in the Salesforce.com database indicates a person in the organization chart is friends with another person in the organizational chart (based on the value of the "Friends With" field shown in FIG. 7), a dotted line 830 should connect the nodes representing those people.

When changes to a visual hierarchy are written back to the data source (or to one or more other data sources), the Data Processing Module 1050 performs the same types of functions as described above, except that it essentially applies the reverse rules to the data to convert it from the visual presentation format to the data source format. The rules applied by the Data Processing Module 1050 also specify which types of data are to be converted to a data source format, and such rules can vary and be customized to suit the needs of a user.

In one embodiment, data in the data source and data in the visual presentation format is stored in XML format. In this embodiment, the Data Storage 1030, Hierarchy Analysis 1020, and Data Retrieval 1040 modules are implemented in XML code and the Data Processing Module 1050 is implemented in XSLT. In such embodiment, the Data Storage 1030 and Data Retrieval 1040 modules respectively store and retrieve data in XML format. As part of the store and retrieve process, the XSLT code in the Data Processing module 1050 converts the data-source-XML format to the visual-hierarchical XML data format and vice versa.

As will be understood by those familiar with the art, the invention may be embodied in other specific forms without departing from the spirit or essential characteristics thereof. Accordingly, the disclosure of the present invention is intended to be illustrative and not limiting of the invention.

The invention claimed is:

1. A method for interfacing with external application data via a mind map, the method comprising:

providing a mind mapping interface capable of displaying data in a mind map comprising hierarchically-arranged graphical nodes, including subnodes extending from a parent node;

enabling a user to import data into the mind mapping interface from an external application that displays data differently than the mind mapping interface;

in response to a user initiating an import of data from the external application, obtaining data, via a remote server, from an external database associated with the external application, wherein the data includes data items that are related to each other in the external database and wherein the data is in an external application format that is different from a mind mapping format used to generate mind maps in the mind mapping interface;

converting the data from the external application format to the mind mapping format by applying defined rules to the data that map data fields, data relationships, and/or data values to graphical and organizational features in the mind mapping interface;

illustrating the data in a mind map in the mind mapping interface, wherein the mind map graphically illustrates relationships between data items, and wherein one or more of such relationships are derived from relationships that exist between the data items in the external database;

enabling a user to edit, via the mind mapping interface, data displayed by the external application by enabling the user to edit the mind map and to initiate, via the mind mapping interface, the write back of changes made in the mind map to the external database;

in response to a user initiating the write back of changes made in the mind map, detecting changes in the mind map relating to the data from the external database;

converting data affected by such changes from the mind mapping format to the external application format by applying defined rules that map graphical and organizational features of the mind map to data fields, data values, and/or data relationships in the external database; and sending the converted data to the remote server for modifying the external database to reflect such changes to the mind map.

2. The method of claim 1, further comprising obtaining data from a second external database, wherein the data from both the external database and the second external database is displayed in the mind map.

3. The method of claim 1, wherein, in response to a user selecting a node in the mind map, further information related to the selected node is illustrated.

4. The method of claim 3, wherein the further information includes further subnodes of the selected node.

5. The method of claim 1, wherein the obtained data includes information about non-hierarchical relationships between data items and wherein the mind map includes a graphical representation of non-hierarchical relationships between data items.

6. The method of claim 1, wherein the graphical features include line colors.

7. The method of claim 1, wherein the graphical features include text colors.

8. The method of claim 1, wherein the graphical features include fill colors.

9. The method of claim 1, wherein the graphical features include icons.

10. The method of claim 1, wherein the graphical features include geometric shapes.

11. The method of claim 1, wherein the graphical features include line styles.

12. The method of claim 1, wherein the graphical features include text formatting.

13. The method of claim 1, wherein the graphical features include spatial positioning of data on a display.

14. The method of claim 1, wherein the remote server is a web server.

15. The method of claim 1, wherein the remote server provides a web service via which external application data is obtained.

16. The method of claim 1, wherein the data obtained from the external database is automatically selected based on a subject matter specified by the user.

17. The method of claim 1, wherein the mind mapping interface includes a connection part associated with the external application that a user is able to add to a mind map, and wherein a user initiates the import of data from the external application by adding the connection part to the mind map.

18. A non-transitory computer-readable medium comprising computer program code, that, when executed by a computer, enables the computer to perform the following method:

providing a mind mapping interface capable of displaying data in a mind map comprising hierarchically-arranged graphical nodes, including subnodes extending from a parent node;

enabling a user to import data into the mind mapping interface from an external application that displays data differently than the mind mapping interface;

in response to a user initiating an import of data from the external application, obtaining data, via a remote server, from an external database associated with the external application, wherein the data includes data items that are related to each other in the external database and wherein the data is in an external application format that is different from a mind mapping format used to generate mind maps in the mind mapping interface;

converting the data from the external application format to the mind mapping format by applying defined rules to the data that map data fields, data relationships, and/or data values to graphical and organizational features in the mind mapping interface;

illustrating the data in a mind map in the mind mapping interface, wherein the mind map graphically illustrates relationships between data items, and wherein one or more of such relationships are derived from relationships that exist between the data items in the external database;

enabling a user to edit, via the mind mapping interface, data displayed by the external application by enabling the user to edit the mind map and to initiate, via the mind mapping interface, the write back of changes made in the mind map to the external database;

in response to a user initiating the write back of changes made in the mind map, detecting changes in the mind map relating to the data from the external database;

converting data affected by such changes from the mind mapping format to the external application format by applying defined rules that map graphical and organizational features of the mind map to data fields, data values, and/or data relationships in the external database; and sending the converted data to the remote server for modifying the external database to reflect such changes to the mind map.

19. The non-transitory computer-readable medium of claim 18, wherein the remote server is a web server.

20. The non-transitory computer-readable medium of claim 18, wherein the remote server provides a web service via which external application data is obtained.

21. The non-transitory computer-readable medium of claim 18, wherein the data obtained from the external database is automatically selected based on a subject matter specified by the user.

22. The non-transitory computer-readable medium of claim 18, wherein the mind mapping interface includes a connection part associated with the external application that a user is able to add to a mind map, and wherein a user initiates the import of data from the external application by adding the connection part to a mind map.

* * * * *